US012632000B2

(12) United States Patent
Nakai et al.

(10) Patent No.: US 12,632,000 B2
(45) Date of Patent: May 19, 2026

(54) IMAGE FORMING APPARATUS

(71) Applicant: FUJIFILM Business Innovation Corp., Tokyo (JP)

(72) Inventors: Daisuke Nakai, Kanagawa (JP); Yutaka Kiuchi, Kanagawa (JP); Tomohisa Suzuki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/321,285

(22) Filed: May 22, 2023

(65) Prior Publication Data

US 2024/0168424 A1 May 23, 2024

(30) Foreign Application Priority Data

Nov. 21, 2022 (JP) ................................ 2022-185902

(51) Int. Cl.
*G03G 15/00* (2006.01)
*G03G 15/01* (2006.01)
*G03G 15/16* (2006.01)

(52) U.S. Cl.
CPC ..... *G03G 15/5054* (2013.01); *G03G 15/0131* (2013.01); *G03G 15/1605* (2013.01); *G03G 15/5037* (2013.01); *G03G 15/5058* (2013.01); *G03G 15/75* (2013.01); *G03G 15/751* (2013.01); *G03G 2215/00059* (2013.01); *G03G 2215/00063* (2013.01)

(58) Field of Classification Search
CPC ........... G03G 15/0131; G03G 15/1605; G03G 15/5037; G03G 15/5054; G03G 15/5058; G03G 15/75; G03G 15/751; G03G 2215/00059; G03G 2215/00063
See application file for complete search history.

(56) References Cited

U.S. PATENT DOCUMENTS 11,644,779 B2 * 5/2023 Nakai ................ G03G 15/5058 399/74
2015/0216636 A1 * 8/2015 Nakamura ............... A61K 6/84 420/436
2021/0405564 A1 * 12/2021 Kitamura ........... G03G 15/5025

FOREIGN PATENT DOCUMENTS

JP 2007-333954 A 12/2007
JP 4923767 B2 4/2012

* cited by examiner

*Primary Examiner* — Joseph S Wong
(74) *Attorney, Agent, or Firm* — Sughrue Mion, PLLC

(57) ABSTRACT

An image forming apparatus includes: multiple intermediate-transfer-member density sensors that are disposed in the axial direction of an intermediate transfer member and that detect corresponding densities of a developer image having been subjected to first transfer onto the intermediate transfer member; and a processor configured to: in response to occurrence of a variation of density on a recording medium, if a relationship between the highest density value and the lowest density value among the density values detected by the respective intermediate-transfer-member density sensors indicates a first density state, output information indicating that the variation of density is caused in a process of or after a second-transfer process in which the developer image having been subjected to first transfer onto the intermediate transfer member is transferred onto the recording medium; and if the relationship indicates a second density state opposite to the first density state, output information indicating that the variation of density is caused in a process before the second-transfer process.

12 Claims, 6 Drawing Sheets

| CAUSE | COPING ACTION |
|---|---|
| CAUSED BY CHARGING DEVICE OR PHOTORECEPTOR DRUM | TO REPLACE CHARGING DEVICE OR PHOTORECEPTOR DRUM |
| CAUSED BY EXPOSURE DEVICE | TO REPLACE EXPOSURE DEVICE |
| CAUSED BY INSUFFICIENT STIRRING OF DEVELOPER | TO REPLACE DEVELOPER OR TO MAKE DENSITY UNIFORM |
| CAUSED BY FIXING DEVICE 19a | TO REPLACE FIXING DEVICE 19a |
| CAUSED BY FIXING DEVICE 19b | TO REPLACE FIXING DEVICE 19b |
| CAUSED BY DEVELOPING DEVICE OR FIRST TRANSFER | TO CALL ENGINEER |
| CAUSED BY SECOND TRANSFER | TO CALL ENGINEER |

FIG. 3

| CAUSE | COPING ACTION |
|---|---|
| CAUSED BY CHARGING DEVICE OR PHOTORECEPTOR DRUM | TO REPLACE CHARGING DEVICE OR PHOTORECEPTOR DRUM |
| CAUSED BY EXPOSURE DEVICE | TO REPLACE EXPOSURE DEVICE |
| CAUSED BY INSUFFICIENT STIRRING OF DEVELOPER | TO REPLACE DEVELOPER OR TO MAKE DENSITY UNIFORM |
| CAUSED BY FIXING DEVICE 19a | TO REPLACE FIXING DEVICE 19a |
| CAUSED BY FIXING DEVICE 19b | TO REPLACE FIXING DEVICE 19b |
| CAUSED BY DEVELOPING DEVICE OR FIRST TRANSFER | TO CALL ENGINEER |
| CAUSED BY SECOND TRANSFER | TO CALL ENGINEER |

IMAGE FORMING APPARATUS

CROSS-REFERENCE TO RELATED APPLICATIONS

This application is based on and claims priority under 35 USC 119 from Japanese Patent Application No. 2022-185902 filed Nov. 21, 2022.

BACKGROUND

(i) Technical Field

The present disclosure relates to an image forming apparatus.

(ii) Related Art

Japanese Unexamined Patent Application Publication No. 2007-333954 discloses an image forming apparatus that supplies a developing controller of a control unit with a lowest-density-value signal, which indicates the lowest density value among the density values obtained by an image reading unit reading a toner image, and that controls an image-forming condition to reduce the deviation between the lowest-density-value signal and an ideal value for a largest-density portion which is stored in a memory of the developing controller.

An image forming apparatus, including multiple image forming units, forms images in such a manner that the image forming units perform first transfer of toner images onto an intermediate transfer member and that the toner images, having been subjected to first transfer onto the intermediate transfer member, are subjected to second transfer onto a recording medium such as a print sheet. In such an image forming apparatus, multiple rollers are used, for example, for the image forming units and a fixing device. Occurrence of some non-uniform state in the main scanning direction of these rollers causes variations of density of an image. Thus, in an image forming apparatus which uses multiple rollers, even when variations of density occur on a recording medium, the location of the cause of the variations of density fails to be identified.

SUMMARY

Aspects of non-limiting embodiments of the present disclosure relate to an image forming apparatus which enables output of information indicating the location of the cause of variations of density.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus comprising: a plurality of intermediate-transfer-member density sensors that are disposed in an axial direction of an intermediate transfer member and that detect corresponding densities of a developer image having been subjected to first transfer onto the intermediate transfer member; and a processor configured to: in response to occurrence of a variation of density on a recording medium, if a relationship between a highest density value and a lowest density value among the density values detected by the respective intermediate-transfer-member density sensors indicates a first density state, output information indicating that the variation of density is caused in a process of or after a second-transfer process in which the developer image having been subjected to first transfer onto the intermediate transfer member is transferred onto the recording medium; and if the relationship indicates a second density state opposite to the first density state, output information indicating that the variation of density is caused in a process before the second-transfer process.

BRIEF DESCRIPTION OF THE DRAWINGS

Exemplary embodiments of the present disclosure will be described in detail based on the following figures, wherein:

FIG. 3 is a diagram illustrating exemplary information stored in a storage device of an image forming apparatus according to an exemplary embodiment of the present disclosure;

DETAILED DESCRIPTION

Figure 1:
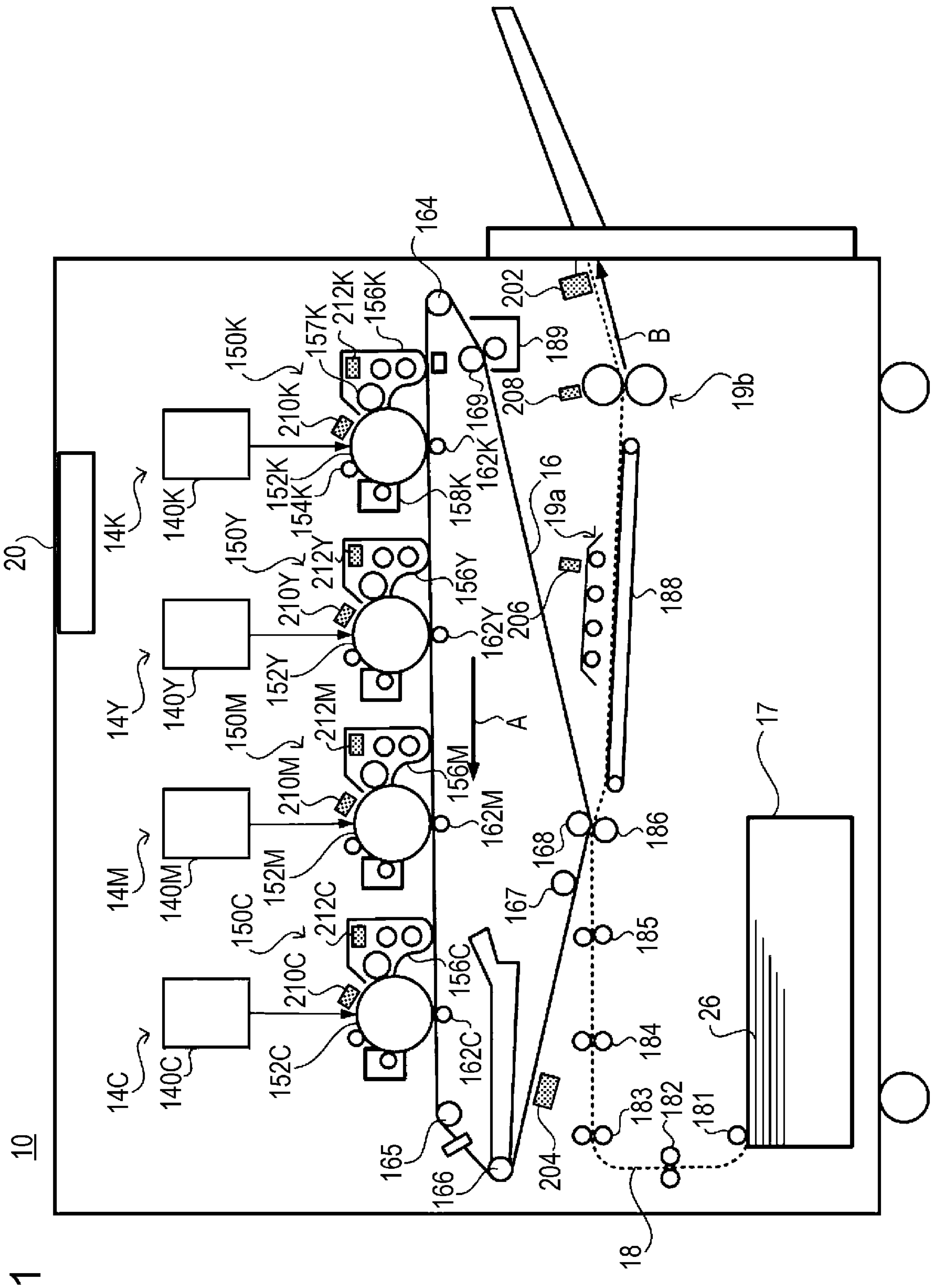
FIG. 1 is a schematic view of the configuration of an image forming apparatus according to an exemplary embodiment of the present disclosure.

Embodiments of the present disclosure will be described in detail by referring to the drawings.

FIG. 1 is a diagram illustrating the configuration of an image forming apparatus 10 according to an exemplary embodiment of the present disclosure.

As illustrated in FIG. 1, the image forming apparatus 10 has image forming units 14K, 14Y, 14M, and 14C, an intermediate transfer belt 16 serving as an intermediate transfer member, a sheet tray 17, a sheet transport path 18, a fixing device 19*a* serving as a first fixing device, a fixing device 19*b* serving as a second fixing device, and a control device 20. The image forming apparatus 10 is a multi-function device provided with, in addition to a printer function of printing image data received from a personal computer (not illustrated) or the like, a function as a full-color copier and a function as a facsimile.

The control device 20 is disposed in an upper portion of the image forming apparatus 10, and, for example, functions as an image-data input unit. The control device 20 performs image processing, such as tone correction and resolution correction, on image data received from a personal computer (not illustrated) or the like through a network line such as a local-area network (LAN), and outputs the resulting data to the image forming units 14.

The four image forming units 14K, 14Y, 14M, and 14C corresponding to the colors used in a color image are disposed below the control device 20. In the present exemplary embodiment, the four image forming units 14K, 14Y, 14M, and 14C, which correspond to the colors of black (K), yellow (Y), magenta (M), and cyan (C), are arranged horizontally at certain intervals along the intermediate transfer belt 16. The intermediate transfer belt 16 rotates in the arrow-A direction in FIG. 1. The four image forming units 14K, 14Y, 14M, and 14C sequentially form toner images, serving as developer images of the respective colors, on the basis of image data received from the control device 20, and perform transfer (first transfer) onto the intermediate transfer belt 16 at timings at which these toner images overlie each other. The order of the colors of the image forming units 14K, 14Y, 14M, and 14C is not limited to the order of black, yellow, magenta, and cyan. The order of the colors may be any such as the order of yellow, magenta, cyan, and black.

The sheet transport path 18 is disposed below the intermediate transfer belt 16. Recording paper 26, which serves as a recording medium supplied from the sheet tray 17, is transported on the sheet transport path 18. Toner images of the colors, which have been transferred onto the intermediate transfer belt 16 so as to be put on top of one another, are collectively transferred (called second transfer) onto the recording paper 26. The transferred toner images are fixed by the fixing device 19*a* and the fixing device 19*b*, and are discharged to the outside along arrow B.

The configurations of the image forming apparatus 10 will be described in detail.

The image forming units 14K, 14Y, 14M, and 14C are disposed horizontally in parallel at certain intervals, and have substantially the same configuration except having different colors of images that are to be formed. Accordingly, the image forming unit 14K will be described below. The configuration of each image forming unit 14 is differentiated by adding the corresponding one of K, Y, M, and C.

The image forming unit 14K has an exposure device 140K for exposing a photoreceptor drum 152K, serving as a photoreceptor, to light by scanning a laser beam in accordance with image data received from the control device 20, and has an image forming device 150K serving as an image forming section which forms an electrostatic latent image by using the laser beam scanned by the exposure device 140K.

The exposure device 140K modulates a laser beam in accordance with image data for black (K), and radiates the modulated laser beam onto the photoreceptor drum 152K of the image forming device 150K.

The image forming device 150K includes the photoreceptor drum 152K rotating at a predetermined rotational speed in the arrow-A direction, a charging device 154K serving as a charging unit which charges the surface of the photoreceptor drum 152K uniformly, a developing device 156K developing an electrostatic latent image formed on the photoreceptor drum 152K, and a cleaning device 158K. The photoreceptor drum 152K is a cylindrical-shaped image-holding body which holds a toner image, and is charged by the charging device 154K uniformly. On the photoreceptor drum 152K, an electrostatic latent image is formed by using a laser beam radiated by the exposure device 140K. The electrostatic latent image formed on the photoreceptor drum 152K is developed by using black (K) toner by the developing device 156K, and is transferred onto the intermediate transfer belt 16. Residual toner, paper dust, and the like, which are attached on the photoreceptor drum 152K after transfer of a toner image, are removed by the cleaning device 158K.

Similarly, the other image forming units 14Y, 14M, and 14C have photoreceptor drums 152Y, 152M, and 152C and developing devices 156Y, 156M, and 156C, respectively. The image forming units 14Y, 14M, and 14C form toner images of the respective colors of yellow (Y), magenta (M), and cyan (C), and transfer the formed toner images of the colors onto the intermediate transfer belt 16.

Thus, the photoreceptor drums 152K, 152Y, 152M, and 152C function as image holding bodies which hold toner images of the respective CMYK colors.

The intermediate transfer belt 16 is formed as an endless belt which goes around a drive roller 164, idle rollers 165, 166, and 167, a backup roller 168, and an idle roller 169 with a certain tension. The drive roller 164 is driven for rotation by a driving motor (not illustrated). Thus, the intermediate transfer belt 16 is driven cyclically at a predetermined speed in the arrow-A direction.

On the intermediate transfer belt 16, first-transfer rollers 162K, 162Y, 162M, and 162C, which serve as first-transfer devices, are disposed at positions facing the image forming units 14K, 14Y, 14M, and 14C, respectively. Toner images of the colors, which are formed on the photoreceptor drums 152K, 152Y, 152M, and 152C, are transferred onto the intermediate transfer belt 16 by the first-transfer rollers 162K, 162Y, 162M, and 162C so as to be put on top of one another. Residual toner attached onto the intermediate transfer belt 16 is removed by using a cleaning blade or a brush of a belt cleaning device 189 disposed downstream of the second-transfer position.

On the sheet transport path 18, a paper feed roller 181 for taking the recording paper 26 out of the sheet tray 17, roller pairs 182, 183, and 184 for sheet transport, and registration rollers 185 for transporting the recording paper 26 to the second-transfer position at a predetermined timing are disposed.

At the second-transfer position on the sheet transport path 18, a second-transfer roller 186, serving as a second-transfer device which presses against the backup roller 168, is disposed. Toner images of the colors, which have been transferred onto the intermediate transfer belt 16 so as to be put on top of one another, are subjected to second transfer onto the recording paper 26 by using the contact pressure and the electrostatic force of the second-transfer roller 186.

The recording paper 26, onto which toner images of the colors have been transferred, is transported to the fixing devices 19*a* and 19*b* by using the transport belt 188.

The fixing device 19*a*, which is disposed at a position facing the transport belt 188, is not in contact with the transport belt 188 and the recording paper 26, onto which toner images of the colors have been transferred, and removes moisture from the recording paper 26.

The fixing device 19*b*, which includes a cylindrical-shaped heating roller and a cylindrical-shaped pressure roller facing the heating roller, heats and applies pressure to the recording paper 26 from which moisture has been removed. Thus, the toner is fused to be fixed on the recording paper 26.

The developing device 156K has a cylindrical-shaped developing roller 157K which rotates to transport a developer to the photoreceptor drum 152K and which forms a toner image on the photoreceptor drum 152K. In the image forming units 14C, 14M, and 14Y which form images of the other colors, developing rollers 157C, 157M, and 157Y are similarly included in the developing devices 156C, 156M, and 156Y.

The image forming apparatus 10 according to the present exemplary embodiment is a wide multi-function device which is capable of printing a large-sized drawing, for example, of A0 size. The photoreceptor drums 152 and, for example, the rollers of the fixing devices 19*a* and 19*b* and the like have lengths of 90 cm to 100 cm, which are longer than those of a typical multi-function device. Inclinations and vibrations of such rollers easily cause variations of density in the main scanning direction. In addition, each member, which is large, is difficult to replace. Accordingly, the image forming apparatus 10 includes multiple sensors to identify the location of the cause of variations of image density in response to occurrence of such variations on the recording paper 26.

A sheet density sensor 202 is disposed downstream, in the direction of transport of the recording paper 26, of the fixing device 19*b* on the sheet transport path 18. The sheet density sensor 202 is formed of multiple sensors arranged in the width direction (also referred to as the axial direction or the main scanning direction) of the sheet transport path 18. By using the sensors, the sheet density sensor 202 is capable of reading, parallel to a main scanning line, the densities of an image on the recording paper 26. That is, the sheet density sensor 202 reads, in the width direction of the recording paper 26, the densities of a fixed image on the recording paper 26, and detects the read densities.

Multiple belt density sensors 204, which serve as intermediate-transfer-member density sensors, are disposed in the width direction (also referred to as the axial direction or the main scanning direction) of the intermediate transfer belt 16 at positions facing the intermediate transfer belt 16. The belt density sensors 204 detect, in the width direction of the intermediate transfer belt 16, the densities of toner images having been subjected to first transfer onto the intermediate transfer belt 16.

In the fixing device 19*a*, multiple temperature sensors 206, which serve as first temperature sensors, are disposed in the axial direction (also referred to as the main scanning direction) of the fixing device 19*a*. The temperature sensors 206 detect a temperature distribution in the axial direction of the fixing device 19*a*.

In the fixing device 19*b*, multiple temperature sensors 208, which serve as second temperature sensors, are disposed in the axial direction (also referred to as the main scanning direction) of the fixing device 19*b*. The temperature sensors 208 detect a temperature distribution in the axial direction of the fixing device 19*b*.

Multiple potential sensors 210K are disposed in the axial direction (also referred to as the main scanning direction) of the photoreceptor drum 152K at positions facing the photoreceptor drum 152K. The potential sensors 210K detect surface potentials of the photoreceptor drum 152K in the axial direction of the photoreceptor drum 152K. In the image forming units 14C, 14M, and 14Y which form images of the other colors, potential sensors 210C, 210M, and 210Y are similarly disposed at positions facing the photoreceptor drums 152C, 152M, and 152Y.

In the developing device 156K, multiple toner density sensors 212K, which serve as developer density sensors, are disposed in the axial direction (also referred to as the main scanning direction) of the developing device 156K. The toner density sensors 212K detect toner densities, serving as developer densities in the developing device 156K, in the axial direction of the developing device 156K. In the image forming units 14C, 14M, and 14Y which form images of the other colors, toner density sensors 212C, 212M, and 212Y are similarly disposed in the developing devices 156C, 156M, and 156Y, respectively.

Figure 2:
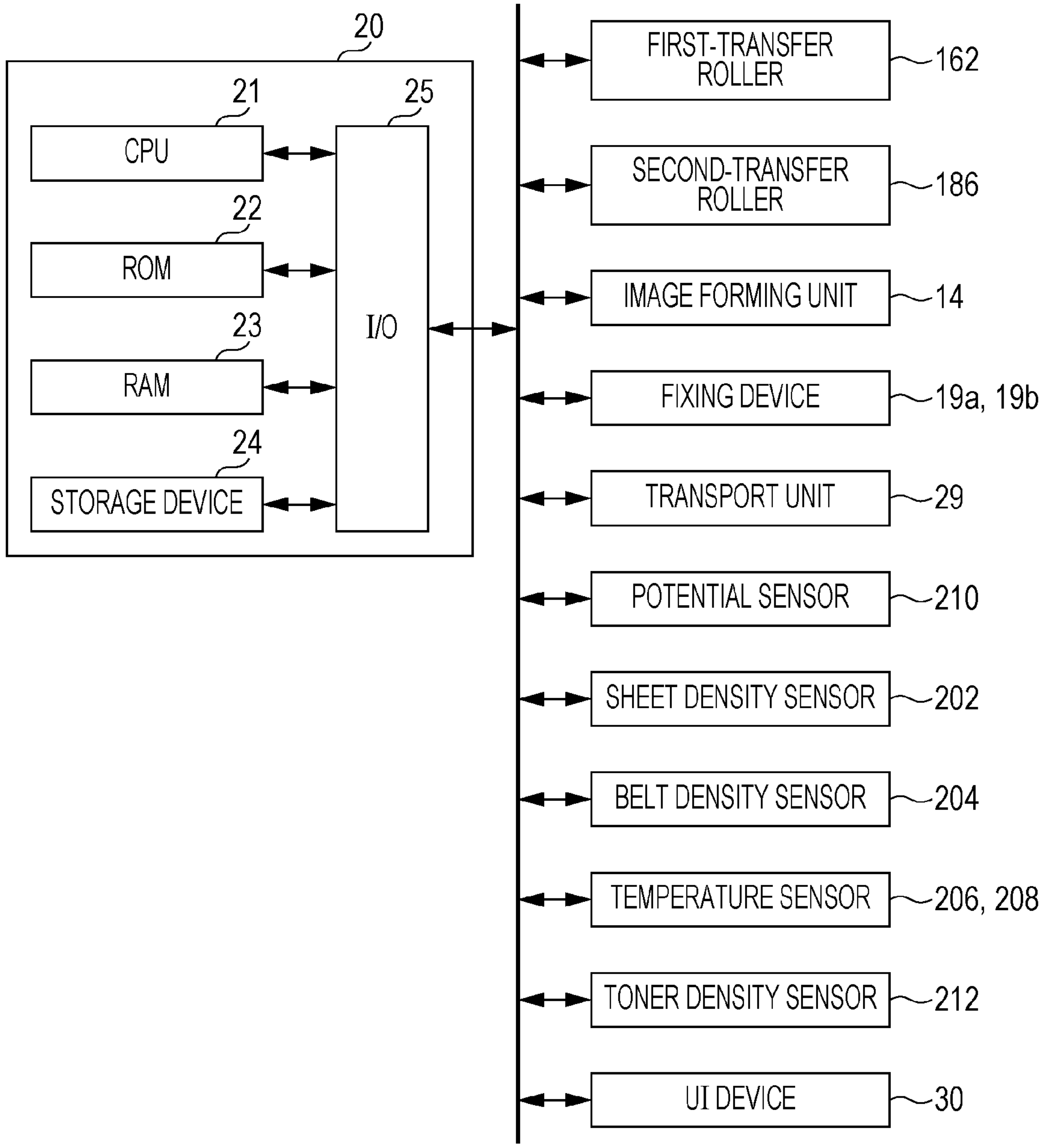
FIG. 2 is a block diagram illustrating the hardware configuration of a control device used in an image forming apparatus according to an exemplary embodiment of the present disclosure.

FIG. 2 illustrates the control configuration of the image forming apparatus 10 according to the present exemplary embodiment.

As illustrated in FIG. 2, the control device 20 has a central processing unit (CPU) 21, a read only memory (ROM) 22, a random access memory (RAM) 23, a storage device 24 such as a hard disk drive, and an input/output interface (hereinafter abbreviated as I/O) 25 which inputs/outputs data, for example, from/to devices over a network. These components are connected to each other through a control bus.

For example, the first-transfer rollers 162, the second-transfer roller 186, the image forming units 14, the fixing devices 19*a* and 19*b*, a transport unit 29, the potential sensors 210, the sheet density sensor 202, the belt density sensors 204, the temperature sensors 206 and 208, the toner density sensors 212, and a user interface (abbreviated as UI) device 30 including a touch panel or a liquid crystal display and a keyboard are connected to the I/O 25. The transport unit 29 includes motors which drive, for example, various types of rollers, which transport the intermediate transfer belt 16, and sheet rollers, which transport the recording paper 26.

The CPU 21 is a processor which performs predetermined processing on the basis of control programs, which are stored in the ROM 22 or the storage device 24, to control operations of the image forming apparatus 10. In the present exemplary embodiment, description is made under the assumption that the CPU 21 reads and executes control programs stored in the ROM 22 or the storage device 24. Alternatively, the programs, which are stored in a storage medium such as a compact disc-read-only memory (CD-ROM), may be provided to the CPU 21.

The UI device 30, which is controlled by the control device 20, displays various types of information on a display screen, for example, of a display operation unit included in the image forming apparatus 10 or of a terminal apparatus. For example, on the basis of control of the control device 20, the UI device 30 outputs and displays, on the display screen, information about the location of the cause of variations of density and a coping action for the location. In addition, the UI device 30 is used as an input unit which inputs various types of operation information made by a user. The UI device 30 receives input from a user in accordance with information, which is output on the UI device 30, on the basis of control of the control device 20.

FIG. 3 illustrates an example of various types of information stored in the storage device 24.

As illustrated in FIG. 3, the storage device 24 stores the following types of information in association with each other: the location of the cause of variations of density; the coping action for the location of the cause of the variations of density. For example, as a coping action for the case in which variations of density are caused by a charging device 154 or a photoreceptor drum 152, "to replace the charging device 154 or the photoreceptor drum 152" is stored. As a coping action for the case in which variations of density are caused by an exposure device 140, "to replace the exposure device 140" is stored. As a coping action for the case in which variations of density are caused by insufficient stirring of a developer, "to replace the developer or to make the density of the developer uniform" is stored. As a coping action for the case in which variations of density are caused by the fixing device 19*a*, "to replace the fixing device 19*a*" is stored. As a coping action for the case in which variations of density are caused by the fixing device 19*b*, "to replace the fixing device 19*b*" is stored. As a coping action for the case in which variations of density are caused by a developing device 156 or first transfer, "to call an engineer" is stored. As a coping action for the case in which variations of density are caused by second transfer, "to call an engineer" is stored.

Figure 4:
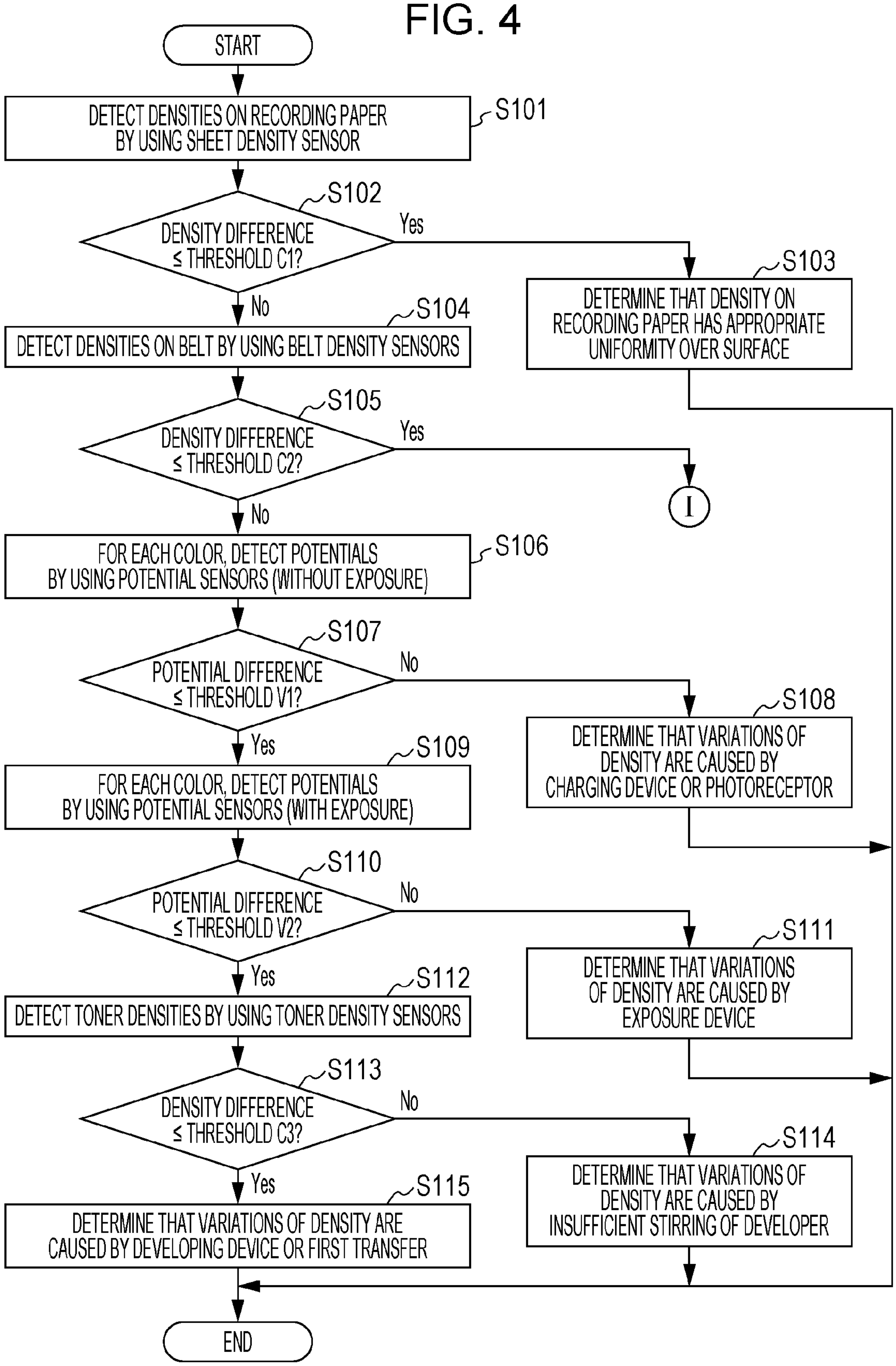
FIG. 4 is a flowchart of operations of an image forming apparatus according to an exemplary embodiment of the present disclosure.
Figure 5:
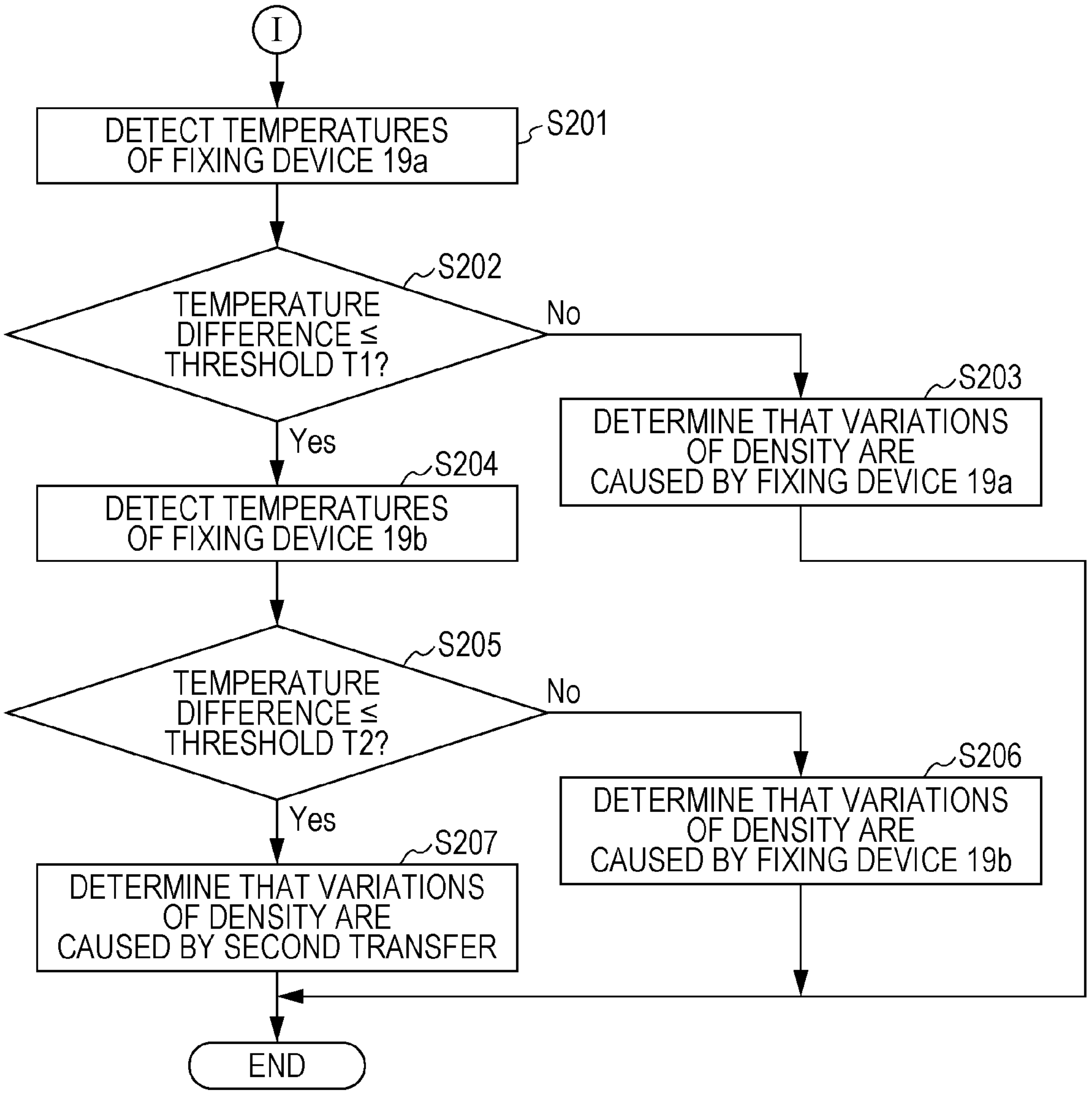
FIG. 5 is a flowchart of operations of an image forming apparatus according to an exemplary embodiment of the present disclosure.

Operations of the image forming apparatus 10, which are performed when the sheet density sensor 202 of the image forming apparatus 10 detects densities of a fixed image on the recording paper 26, will be described by using FIGS. 4 and 5.

In step S101, the CPU 21 causes the sheet density sensor 202 to detect densities of a fixed image on the recording paper 26 in the sheet width direction.

In step S102, the CPU 21 determines whether the relationship between the highest density value and the lowest density value among the density values detected by the sheet density sensor 202 indicates a predetermined density state or a state opposite to the predetermined density state. Specifically, for example, the density difference, which is the difference between the highest density value and the lowest density value, is calculated. For the highest density value, the highest value among the detected density values may be determined to be noise; the second highest density value or a high value lower than the second highest density value may be used as the highest density value. Similarly, for the lowest density value, the lowest value among the detected density values may be determined to be noise; the second lowest density value or a low value higher than the second lowest density value may be used as the lowest density value. The CPU 21 determines whether the calculated density difference indicates the predetermined density state, that is, whether the calculated density difference is less than or equal to a threshold C1 which is a preset value. In this example, the difference between the highest density value and the lowest density value is used; it is determined whether the difference is less than or equal to the threshold. However, the configuration is not limited to this. The ratio of the highest density value to the lowest density value may be used; it may be determined whether the difference is less than or equal to a threshold.

In step S102, if the calculated density difference is less than or equal to the threshold C1, in step S103, the CPU 21 determines that the density of the image on the recording paper 26 has appropriate uniformity over its surface, and ends the process.

In step S102, if the calculated density difference indicates the state opposite to the predetermined density state, that is, if the calculated density difference is greater than the threshold C1, in step S104, the CPU 21 causes the belt density sensors 204 to detect densities of toner images, which have been subjected to first transfer onto the intermediate transfer belt 16, in the width direction of the intermediate transfer belt 16.

In step S105, the CPU 21 determines whether the relationship between the highest density value and the lowest density value among the density values detected by the belt density sensors 204 indicates a first density state or a second density state opposite to the first density state. Specifically, for example, the density difference, which is the difference between the highest density value and the lowest density value, is calculated. For the highest density value, the highest value among the detected density values may be determined to be noise; the second highest density value or a high value lower than the second highest density value may be used as the highest density value. Similarly, for the lowest density value, the lowest value among the detected density values may be determined to be noise; the second lowest density value or a low value higher than the second lowest density value may be used as the lowest density value. The CPU 21 determines whether the calculated density difference indicates the first density state, that is, whether the calculated density difference is less than or equal to a threshold C2 which is a predetermined value. In this example, the difference between the highest density value and the lowest density value is used; it is determined whether the difference is less than or equal to the threshold. However, the configuration is not limited to this. The ratio of the highest density value to the lowest density value may be used; it may be determined whether the ratio is less than or equal to a threshold.

In step S105, if the calculated density difference indicates the second density state, that is, if the calculated density difference is greater than the threshold C2, the CPU 21 determines (or estimates) that the variations of density are caused in a process before the second-transfer process performed by using the second-transfer roller 186. Information indicating that the variations of density are caused in a process before the second-transfer process may be output.

Alternatively, when, among density values of colors which are detected by the belt density sensors 204, the density difference, which is difference between the highest density value and the lowest density value, for a certain color is greater than the threshold C2, the CPU 21 may output information indicating that the variations of density are caused by the image forming unit 14 for the certain color.

That is, the CPU 21 may output information indicating that the variations of density in the image forming unit 14 for the certain color are caused by at least any of the following components for the certain color: the first-transfer roller 162; the photoreceptor drum 152; the developing device 156; the charging device 154; the exposure device 140.

Specifically, for example, when the difference between the highest density value and the lowest density value for yellow (Y) is greater than the threshold C2, the CPU 21 outputs information indicating that the variations of density are caused by the image forming unit 14Y. Further, the CPU 21 may output information indicating that the variations of density are caused by at least any of the following components: the first-transfer roller 162Y; the photoreceptor drum 152Y; the developing device 156Y: the charging device 154Y; the exposure device 140Y.

If the CPU 21 determines that the variations of density are caused in a process before the second-transfer process, in step S106, the CPU 21 causes the potential sensors 210K to detect surface potentials of the photoreceptor drum 152K in the axial direction of the photoreceptor drum 152K in the state in which the photoreceptor drum 152K has been charged by the charging device 154K and is not exposed to light by the exposure device 140K. In the image forming units 14C, 14M, and 14Y which form images of the other colors, the CPU 21 similarly causes the potential sensors 210C, 210M, and 210Y to detect surface potentials of the photoreceptor drums 152C, 152M, and 152Y, respectively, in the axial direction of the respective photoreceptor drums 152.

In step S107, the CPU 21 determines whether the relationship between the highest potential value and the lowest potential value among the potential values, which are detected by the potential sensors 210 without exposure to light, indicates a first potential state or a second potential state opposite to the first potential state. Specifically, for example, the potential difference, which is the difference between the highest potential value and the lowest potential value, is calculated. For the highest potential value, the highest value among the detected potential values may be determined to be noise; the second highest potential value or a high value lower than the second highest potential value may be used as the highest potential value. Similarly, for the lowest potential value, the lowest value among the detected potential values may be determined to be noise; the second lowest potential value or a low value higher than the second lowest potential value may be used as the lowest potential value. The CPU 21 determines whether the calculated potential difference is less than or equal to a threshold V1 which is a predetermined value.

In step S107, if the calculated potential difference indicates the first potential state, that is, if the calculated potential difference is greater than the threshold V1, in step S108, the CPU 21 determines that the variations of density are caused by the charging device 154 or the photoreceptor drum 152, and outputs the determined location of the cause of the variations of density. That is, the CPU 21 outputs information indicating that the variations of density are caused by the charging device 154 or the photoreceptor drum 152.

In step S107, if the calculated potential difference indicates the second potential state, that is, if the calculated potential difference is less than or equal to the threshold V1, in step S109, the CPU 21 causes the potential sensors 210K to detect surface potentials of the photoreceptor drum 152K in the axial direction of the photoreceptor drum 152K in the state in which the photoreceptor drum 152K has been charged by the charging device 154K and has been exposed to light by the exposure device 140K. In the image forming units 14C, 14M, and 14Y which form images of the other colors, the CPU 21 similarly causes the potential sensors 210C, 210M, and 210Y to detect surface potentials of the photoreceptor drums 152C, 152M, and 152Y, respectively, in the axial direction of the respective photoreceptor drums 152 in the state in which the photoreceptor drums 152C, 152M, and 152Y have been exposed to light by the exposure devices 140C, 140M, and 140Y, respectively.

In step S110, the CPU 21 determines whether the relationship between the highest potential value and the lowest potential value among the potential values, which are detected by the potential sensors 210 with exposure to light, indicates a third potential state or a fourth potential state opposite to the third potential state. Specifically, for example, the potential difference, which is the difference between the highest potential value and the lowest potential value, is calculated. For the highest potential value, the highest value among the detected potential values may be determined to be noise; the second highest potential value or a high value lower than the second highest potential value may be used as the highest potential value. Similarly, for the lowest potential value, the lowest value among the detected potential values may be determined to be noise; the second lowest potential value or a low value higher than the second lowest potential value may be used as the lowest potential value. The CPU 21 determines whether the calculated potential difference is less than or equal to a threshold V2 which is a preset value.

In step S110, if the calculated potential difference indicates the third potential state, that is, if the calculated potential difference is greater than the threshold V2, in step S111, the CPU 21 determines that the variations of density are caused by the exposure device 140, and outputs information indicating the determined location of the cause of the variations of density. That is, the CPU 21 outputs information indicating that the variations of density are caused by the exposure device 140.

In step S110, if the calculated potential difference indicates the fourth potential state, that is, if the calculated potential difference is less than or equal to the threshold V2, in step S112, the CPU 21 causes the toner density sensors 212K to detect toner densities in the developing device 156K in the axial direction of the developing device 156K. That is, the CPU 21 uses the detection results from the toner density sensors 212K to output information indicating the location of the cause of the variations of density. In the image forming units 14C, 14M, and 14Y which form images of the other colors, the CPU 21 similarly causes the toner density sensors 212C, 212M, and 212Y to detect toner densities in the developing devices 156C, 156M, and 156Y, respectively, in the axial direction of the respective developing devices 156.

In step S113, the CPU 21 determines whether the relationship between the highest density value and the lowest density value among the density values detected by the toner density sensors 212 indicates a third density state or a fourth density state opposite to the third density state. Specifically, for example, the density difference, which is the difference between the highest density value and the lowest density value, is calculated. For the highest density value, the highest value among the detected density values may be determined to be noise; the second highest density value or a high value lower than the second highest density value may be used as the highest density value. Similarly, for the lowest density value, the lowest value among the detected density values may be determined to be noise; the second lowest density value or a low value higher than the second lowest density value may be used as the lowest density value. The CPU 21 determines whether the calculated density difference is less than or equal to a threshold C3 which is a predetermined value. In this example, the difference between the highest density value and the lowest density value is used; it is determined whether the difference is less than or equal to the threshold. However, the configuration is not limited to this. The ratio of the highest density value to the lowest density value may be used; it may be determined whether the ratio is less than or equal to a threshold.

In step S113, if the calculated density difference indicates the fourth density state, that is, if the calculated density difference is greater than the threshold C3, in step S114, the CPU 21 determines that the variations of density are caused by insufficient stirring of the developer, and outputs the determined location of the cause of the variations of density. That is, the CPU 21 outputs information indicating that the variations of density are caused by insufficient stirring of the developer.

In step S113, if the calculated density difference indicates the third density state, that is, if the calculated density difference is less than or equal to the threshold C3, in step S115, the CPU 21 determines that the variations of density are caused by the developing device 156 or the first-transfer process, and outputs the determined location of the cause of the variations of density. That is, the CPU 21 outputs information indicating that the variations of density are caused by the developing device 156 or the first-transfer process.

In step S105, if the density difference, which is the difference between the highest density value and the lowest density value among the density values detected by the belt density sensors 204, is less than or equal to the threshold C2, the CPU 21 determines that the variations of density are caused in a process of or after the second-transfer process in which the toner images, which have been subjected to first transfer onto the intermediate transfer belt 16, are transferred onto the recording paper 26. Alternatively, the CPU 21 may output information indicating that the variations of density are caused in a process of or after the second-transfer process.

If the CPU 21 determines that the variations of density are caused in a process of or after the second-transfer process, in step S201, the CPU 21 causes the temperature sensors 206 to detect a temperature distribution in the axial direction of the fixing device 19*a*.

In step S202, the CPU 21 determines whether the relationship between the highest temperature value and the lowest temperature value among the temperature values detected by the temperature sensors 206 indicates a first temperature state or a second temperature state opposite to the first temperature state. Specifically, for example, the temperature difference, which is the difference between the highest temperature value and the lowest temperature value, is calculated. For the highest temperature value, the highest value among the detected temperature values may be determined to be noise; the second highest temperature value or a high value lower than the second highest temperature value may be used as the highest temperature value. Similarly, for the lowest temperature value, the lowest value among the detected temperature values may be determined to be noise; the second lowest temperature value or a low value higher than the second lowest temperature value may be used as the lowest temperature value. The CPU 21 determines whether the calculated temperature difference is less than or equal to a threshold T1 which is a predetermined value. In this example, the difference between the highest temperature value and the lowest temperature value is used; it is determined whether the difference is less than or equal to the threshold. However, the configuration is not limited to this. The ratio of the highest temperature value to the lowest temperature value may be used; it may be determined whether the ratio is less than or equal to a threshold.

In step S202, if the calculated temperature difference indicates the first temperature state, that is, if the calculated temperature difference is greater than the threshold T1, in step S203, the CPU 21 determines that the variations of density are caused by the fixing device 19*a*, and outputs the determined location of the cause of the variations of density. That is, the CPU 21 outputs information indicating that the variations of density are caused by the fixing device 19*a*.

In step S202, if the calculated temperature difference indicates the second temperature state, that is, if the calculated temperature difference is less than or equal to the threshold T1, the CPU 21 determines that the variations of density are caused in a process downstream, in the transport direction of the recording paper 26, of the fixing device 19*a* or in the second-transfer process. The CPU 21 may output information indicating that the variations of density are caused in a process downstream, in the transport direction of the recording paper 26, of the fixing device 19*a* or in the second-transfer process.

In step S202, if the calculated temperature difference is less than or equal to the threshold T1, in step S204, the CPU 21 causes the temperature sensors 208 to detect a temperature distribution in the axial direction of the fixing device 19*b*.

In step S205, the CPU 21 determines whether the relationship between the highest temperature value and the lowest temperature value among the temperature values detected by the temperature sensors 208 indicates a third temperature state or a fourth temperature state opposite to the third temperature state. Specifically, for example, the temperature difference, which is the difference between the highest temperature value and the lowest temperature value, is calculated. For the highest temperature value, the highest value among the detected temperature values may be determined to be noise; the second highest temperature value or a high value lower than the second highest temperature value may be used as the highest temperature value. Similarly, for the lowest temperature value, the lowest value among the detected temperature values may be determined to be noise; the second lowest temperature value or a low value higher than the second lowest temperature value may be used as the lowest temperature value. The CPU 21 determines whether the calculated temperature difference is less than or equal to a threshold T2 which is a predetermined value. In this example, the difference between the highest temperature value and the lowest temperature value is used; it is determined whether the difference is less than or equal to the threshold. However, the configuration is not limited to this. The ratio of the highest temperature value to the lowest temperature value may be used; it may be determined whether the ratio is less than or equal to a threshold.

In step S205, if the calculated temperature difference indicates the third temperature state, that is, if the calculated temperature difference is greater than the threshold T2, in step S206, the CPU 21 determines that the variations of density are caused by the fixing device 19*b*, and outputs the determined location of the cause of the variations of density. That is, the CPU 21 outputs information indicating that the variations of density are caused by the fixing device 19*b*.

In step S205, if the calculated temperature difference indicates the fourth temperature state, that is, if the calculated temperature difference is less than or equal to the threshold T2, in step S207, the CPU 21 determines that the variations of density are caused in the second-transfer process, and outputs the determined location of the cause of the variations of density. That is, the CPU 21 outputs information indicating that the variations of density are caused in the second-transfer process.

Figure 6:
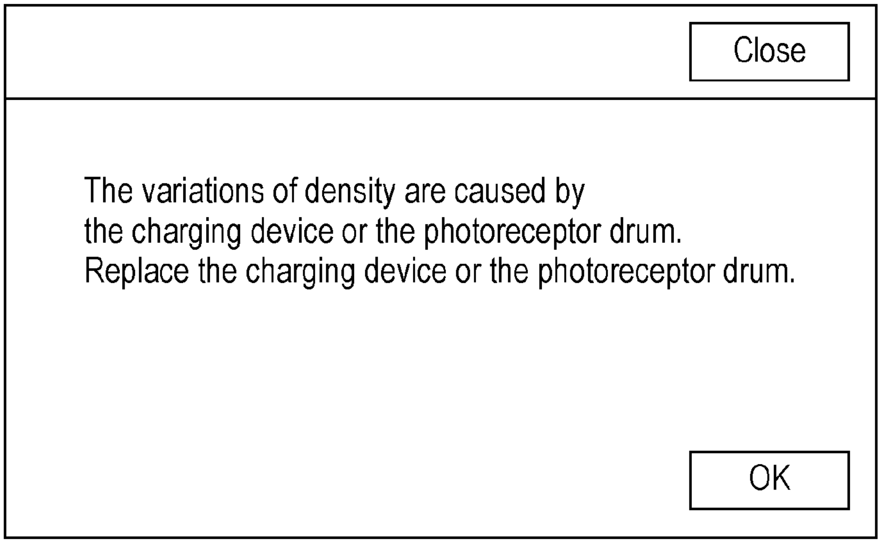
FIG. 6 is a diagram illustrating an exemplary display screen of an image forming apparatus according to an exemplary embodiment of the present disclosure.

FIG. 6 is a diagram illustrating an example in which the location of the cause is output on the UI device 30 when, in step S108, it is determined that the variations of density are caused by a charging device 154 or a photoreceptor drum 152.

Assume that, in step S108, it is determined that the variations of density are caused by the charging device 154 or the photoreceptor drum 152. On the basis of the information, as illustrated in FIG. 3, stored in the storage device 24, the CPU 21 exerts control so that information, indicating that the determined location of the cause of the variations of density is the charging device 154 or the photoreceptor drum 152, is output and displayed on the UI device 30.

In the embodiment above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiments above, and may be changed.

MODIFIED EXAMPLES

In the exemplary embodiment described above, the case in which the present disclosure is applied to a wide multifunction device is described. The present disclosure is not limited to this. The present disclosure may be similarly applied to other image forming apparatuses such as a large printer for business.

In the exemplary embodiment described above, the case in which detection results from the sheet density sensor 202 are used to identify the location of the cause of variations of density is described. However, the present disclosure is not limited to this. The sheet density sensor 202 is not necessarily used. For example, the present disclosure may be similarly applied to the case in which, when a user determines that variations of density occur on the recording paper 26, the location of the cause of the variations of density is identified.

In the exemplary embodiment described above, the case in which two fixing devices are included is described. However, the present disclosure is not limited to this. The present disclosure may be similarly applied to the case in which a single fixing device or three or more fixing devices are included.

In the exemplary embodiment described above, the case in which image forming units of four YMCK colors are included is described. However, the present disclosure is not limited to this. The present disclosure may be similarly applied to the case in which image forming units of four or more colors or an image forming unit for black and white (monochrome) is included.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An image forming apparatus comprising:

a plurality of intermediate-transfer-member density sensors that are disposed in an axial direction of an intermediate transfer member and that detect corresponding densities of a developer image having been subjected to first transfer onto the intermediate transfer member; and a processor configured to:

in response to occurrence of a variation of density on a recording medium, if a relationship between a highest density value and a lowest density value among the density values detected by the respective intermediate-transfer-member density sensors indicates a first density state, output information indicating that the variation of density is caused in a process of or after a second-transfer process in which the developer image having been subjected to first transfer onto the intermediate transfer member is transferred onto the recording medium; and if the relationship indicates a second density state opposite to the first density state, output information indicating that the variation of density is caused in a process before the second-transfer process.

(((2)))

The image forming apparatus according to (((1))), further comprising:

a plurality of temperature sensors that are disposed in an axial direction of a fixing device and that detect corresponding temperatures of the fixing device, wherein the processor is configured to:

when it is determined that the variation of density is caused in a process of or after the second-transfer process, if a relationship between a highest temperature value and a lowest temperature value among the temperature values detected by the respective temperature sensors indicates a first temperature state, output information indicating that the variation of density is caused by the fixing device.

(((3)))

The image forming apparatus according to (((2))), wherein the processor is configured to:

if the relationship between the highest temperature value and the lowest temperature value among the temperature values detected by the respective temperature sensors indicates a second temperature state opposite to the first temperature state, output information indicating that the variation of density is caused in a process downstream, in a transport direction of the recording medium, of the fixing device or by a second-transfer device which performs the second-transfer process.

(((4)))

The image forming apparatus according to any one of (((1))) to (((3))), further comprising:

a plurality of potential sensors that are disposed in an axial direction of a photoreceptor and that detect corresponding surface potentials of the photoreceptor, wherein the processor is configured to:

when it is determined that the variation of density is caused in a process before the second-transfer process, if a relationship between a highest potential value and a lowest potential value among potential-without-exposure values indicates a first potential state, the potential-without-exposure values being potential values detected by the respective potential sensors in a state in which the photoreceptor is charged by a charging device and is not exposed to light by an exposure device, output information indicating that the variation of density is caused by the charging device or the photoreceptor.

(((5)))

The image forming apparatus according to (((4))), wherein the processor is configured to:

if the relationship between the highest potential value and the lowest potential value among the potential-without-exposure values detected by the respective potential sensors indicates a second potential state opposite to the first potential state, output information about a location of a cause of the variation of density by using detection results of the plurality of potential sensors, the detection results being obtained in the state in which the photoreceptor is charged by the charging device and is exposed to light by the exposure device.

(((6)))

The image forming apparatus according to (((5))), wherein the processor is configured to:

if a relationship between a highest potential value and a lowest potential value among potential-with-exposure values indicates a third potential state, the potential-with-exposure values being potential values detected by the respective potential sensors in a state in which the photoreceptor is charged by the charging device and is exposed to light by the exposure device, output information indicating that the variation of density is caused by the exposure device.

(((7)))

The image forming apparatus according to (((5))) or (((6))), further comprising:

a plurality of developer density sensors that are disposed in an axial direction of a developing device and that detect corresponding developer densities in the developing device, wherein the processor is configured to;

if the relationship between the highest potential value and the lowest potential value among the potential-with-exposure values detected by the respective potential sensors indicates a fourth potential state opposite to the third potential state, output information about a location of a cause of the variation of density by using detection results of the plurality of developer density sensors.

(((8)))

The image forming apparatus according to (((7))), wherein the processor is configured to:

if a relationship between a highest density value and a lowest density value among the density values detected by the respective developer density sensors indicates a third density state, output information indicating that the variation of density is caused by the developing device or a first-transfer device which performs first transfer of the developer image onto the intermediate transfer member.

(((9)))

The image forming apparatus according to (((7))) or (((8))), wherein the processor is configured to:

if the relationship between the highest density value and the lowest density value among the density values detected by the respective developer density sensors indicates a fourth density state opposite to the third density state, output information indicating that the variation of density is caused by insufficient stirring of a developer in the developing device.

(((10)))

The image forming apparatus according to any one of (((1))) to (((9))), wherein the processor is configured to:

if a relationship between a highest density value and a lowest density value for a certain color among density values for a plurality of colors indicates a fifth density state, the density values for the plurality of colors being detected by the plurality of intermediate-transfer-member density sensors, output information indicating that the variation of density is caused by an image forming section for the certain color.

(((11)))

The image forming apparatus according to (((10))), wherein the processor is configured to:

output information indicating that the variation of density occurring in the image forming section for the certain color is caused by at least any of devices for the certain color, that is, a first-transfer device, a photoreceptor, a developing device, a charging device, and an exposure device.

What is claimed is:

1. An image forming apparatus comprising:

a plurality of intermediate-transfer-member density sensors that are disposed in an axial direction of an intermediate transfer member and that detect corresponding densities of a developer image having been subjected to first transfer onto the intermediate transfer member; and a processor configured to:

in response to occurrence of a variation of density on a recording medium, if a relationship between a highest density value and a lowest density value among the density values detected by the respective intermediate-transfer-member density sensors indicates a first density state, output information indicating that the variation of density is caused in a process of or after a second-transfer process in which the developer image having been subjected to first transfer onto the intermediate transfer member is transferred onto the recording medium; and if the relationship indicates a second density state opposite to the first density state, output information indicating that the variation of density is caused in a process before the second-transfer process.

2. The image forming apparatus according to claim 1, further comprising:

a plurality of temperature sensors that are disposed in an axial direction of a fixing device and that detect corresponding temperatures of the fixing device, wherein the processor is configured to:

when it is determined that the variation of density is caused in a process of or after the second-transfer process, if a relationship between a highest temperature value and a lowest temperature value among the temperature values detected by the respective temperature sensors indicates a first temperature state, output information indicating that the variation of density is caused by the fixing device.

3. The image forming apparatus according to claim 2, wherein the processor is configured to:

if the relationship between the highest temperature value and the lowest temperature value among the temperature values detected by the respective temperature sensors indicates a second temperature state opposite to the first temperature state, output information indicating that the variation of density is caused in a process downstream, in a transport direction of the recording medium, of the fixing device or by a second-transfer device which performs the second-transfer process.

4. The image forming apparatus according to claim 1, further comprising:

a plurality of potential sensors that are disposed in an axial direction of a photoreceptor and that detect corresponding surface potentials of the photoreceptor, wherein the processor is configured to:

when it is determined that the variation of density is caused in a process before the second-transfer process, if a relationship between a highest potential value and a lowest potential value among potential-without-exposure values indicates a first potential state, the potential-without-exposure values being potential values detected by the respective potential sensors in a state in which the photoreceptor is charged by a charging device and is not exposed to light by an exposure device, output information indicating that the variation of density is caused by the charging device or the photoreceptor.

5. The image forming apparatus according to claim 4, wherein the processor is configured to:

if the relationship between the highest potential value and the lowest potential value among the potential-without-exposure values detected by the respective potential sensors indicates a second potential state opposite to the first potential state, output information about a location of a cause of the variation of density by using detection results of the plurality of potential sensors, the detection results being obtained in the state in which the photoreceptor is charged by the charging device and is exposed to light by the exposure device.

6. The image forming apparatus according to claim 5, wherein the processor is configured to:

if a relationship between a highest potential value and a lowest potential value among potential-with-exposure values indicates a third potential state, the potential-with-exposure values being potential values detected by the respective potential sensors in a state in which the photoreceptor is charged by the charging device and is exposed to light by the exposure device, output information indicating that the variation of density is caused by the exposure device.

7. The image forming apparatus according to claim 6, further comprising:

a plurality of developer density sensors that are disposed in an axial direction of a developing device and that detect corresponding developer densities in the developing device, wherein the processor is configured to;

if the relationship between the highest potential value and the lowest potential value among the potential-with-exposure values detected by the respective potential sensors indicates a fourth potential state opposite to the third potential state, output information about a location of a cause of the variation of density by using detection results of the plurality of developer density sensors.

8. The image forming apparatus according to claim 7, wherein the processor is configured to:

if a relationship between a highest density value and a lowest density value among the density values detected by the respective developer density sensors indicates a third density state, output information indicating that the variation of density is caused by the developing device or a first-transfer device which performs first transfer of the developer image onto the intermediate transfer member.

9. The image forming apparatus according to claim 8, wherein the processor is configured to:

if the relationship between the highest density value and the lowest density value among the density values detected by the respective developer density sensors indicates a fourth density state opposite to the third density state, output information indicating that the variation of density is caused by insufficient stirring of a developer in the developing device.

10. The image forming apparatus according to claim 1, wherein the processor is configured to:

if a relationship between a highest density value and a lowest density value for a certain color among density values for a plurality of colors indicates a fifth density state, the density values for the plurality of colors being detected by the plurality of intermediate-transfer-member density sensors, output information indicating that the variation of density is caused by an image forming section for the certain color.

11. The image forming apparatus according to claim 10, wherein the processor is configured to:

output information indicating that the variation of density occurring in the image forming section for the certain color is caused by at least any of devices for the certain color, that is, a first-transfer device, a photoreceptor, a developing device, a charging device, and an exposure device.

12. An image forming apparatus comprising:

means for detecting densities of a developer image in an axial direction of an intermediate transfer member, the developer image having been subjected to first transfer onto the intermediate transfer member; and means for outputting information in response to occurrence of a variation of density on a recording medium, wherein, if a relationship between a highest density value and a lowest density value among the density values detected by the means for detecting densities indicates a first density state, the information indicates that the variation of density is caused in a process of or after a second-transfer process in which the developer image having been subjected to first transfer onto the intermediate transfer member is transferred onto the recording medium, and wherein, if the relationship indicates a second density state opposite to the first density state, the information indicates that the variation of density is caused in a process before the second-transfer process.

* * * * *